United States Patent
Dahlgren et al.

(12) 
(10) Patent No.: US 6,199,823 B1
(45) Date of Patent: Mar. 13, 2001

(54) SOLENOID VALVE WITH AN EXTERNAL SLEEVE ARMATURE

(75) Inventors: Derek A. Dahlgren, Wauwatosa; Thomas J. Stobbs, Brookfield; James R. Ward, Milwaukee, all of WI (US)

(73) Assignee: TLX Technologies, Waukesha, WI (US)

( * ) Notice: Subject to any disclaimer, the term of this patent is extended or adjusted under 35 U.S.C. 154(b) by 0 days.

(21) Appl. No.: 09/398,607

(22) Filed: Sep. 17, 1999

(51) Int. Cl.$^7$ ................................ H01F 7/08; B60R 2/16; F16K 31/02
(52) U.S. Cl. ............... 251/117; 251/129.07; 251/129.15; 251/344; 335/279
(58) Field of Search .................. 251/129.07, 129.01, 251/129.15, 129.21, 117, 127, 343, 344; 335/256, 261, 269, 279; 280/735

(56) References Cited

U.S. PATENT DOCUMENTS

| | | |
|---|---|---|
| 4,501,298 * | 2/1985 | Inada et al. ..................... 251/129.15 |
| 4,513,780 | 4/1985 | Evans ........................... 251/129.21 X |
| 4,534,375 | 8/1985 | Fox .............................. 251/129.21 X |
| 4,746,887 * | 5/1988 | Nogata et al. ....................... 335/261 |
| 4,858,956 | 8/1989 | Taxon ............................... 251/129.07 |
| 4,875,499 | 10/1989 | Fox ............................. 251/129.21 X |
| 4,978,074 | 12/1990 | Weinand . |
| 5,026,123 | 6/1991 | Nokubo et al. . |
| 5,197,507 | 3/1993 | Miki et al. . |
| 5,419,369 | 5/1995 | House et al. ................. 251/129.21 X |
| 5,533,707 * | 7/1996 | Beesley ............................ 251/129.15 |
| 5,579,807 | 12/1996 | Kohler . |
| 5,586,747 | 12/1996 | Bennardo et al. . |
| 5,845,672 | 12/1998 | Reuter et al. ............... 251/129.15 X |
| 5,853,028 | 12/1998 | Ness et al. . |
| 5,871,201 * | 2/1999 | Cornea et al. ................... 251/129.15 |
| 5,887,621 * | 3/1999 | Doll ............................ 251/129.07 X |
| 6,068,288 * | 5/2000 | Karolek et al. ....................... 280/735 |

* cited by examiner

*Primary Examiner*—Kevin Shaver
*Assistant Examiner*—Eric Keasel
(74) *Attorney, Agent, or Firm*—Reinhart, Boerner, Van Deuren, Norris & Rieselbach, s.c.

(57) ABSTRACT

A solenoid actuated valve includes a valve body and a sleeve armature slidably mounted on the valve body for movement between a flow preventing position and positions away from the flow preventing position. In one embodiment, the sleeve armature and the valve body are configured and arranged to define flow diverters in fluid flow paths to provide flow balance. The movement of the sleeve armature between closed and open positions is controlled by first and second solenoid coils, and, the sleeve armature is maintained in the position to which it has been driven by residual magnetism. In another embodiment, a solenoid actuated valve includes a bias structure for urging the sleeve armature toward the closed position. The solenoid actuated fluid flow control valve is described with reference to an application for inflating inflatable restraints for an occupant of a vehicle.

32 Claims, 11 Drawing Sheets

FIG. 2
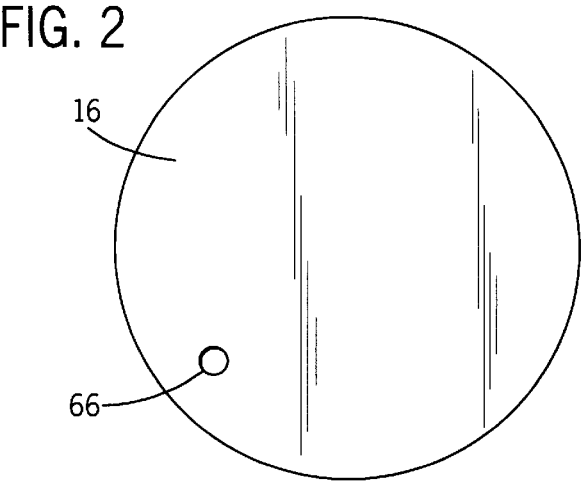
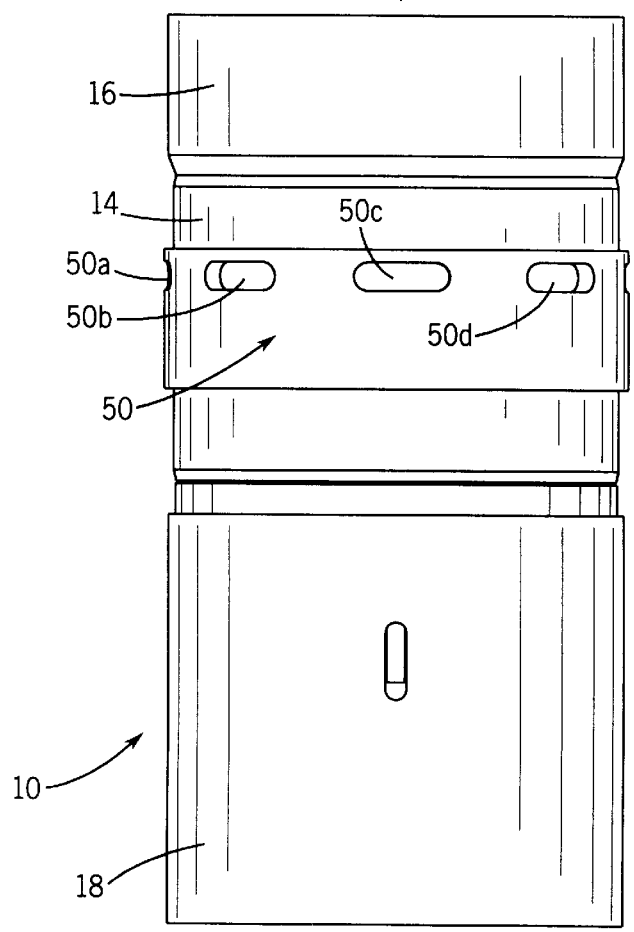
FIG. 3

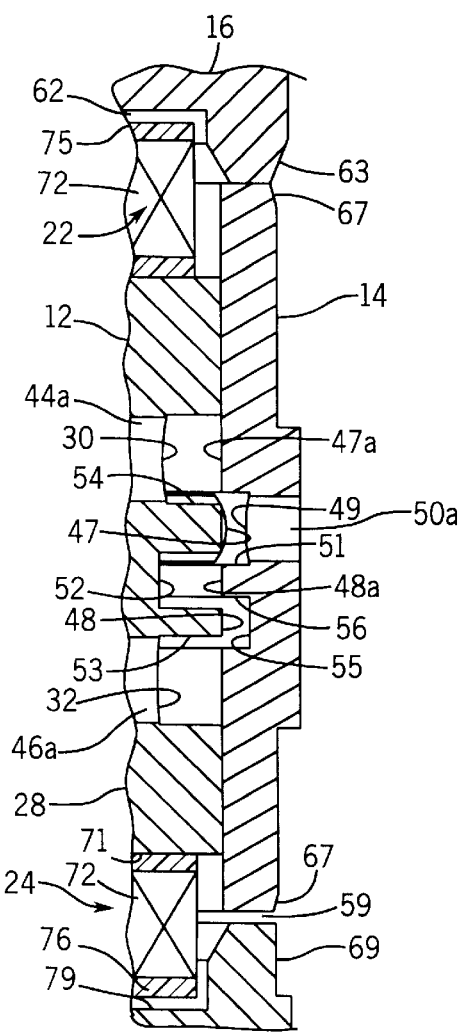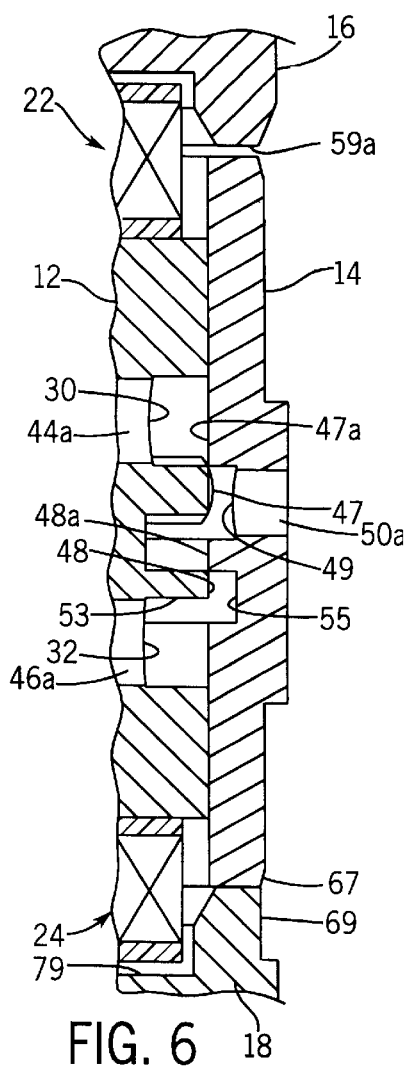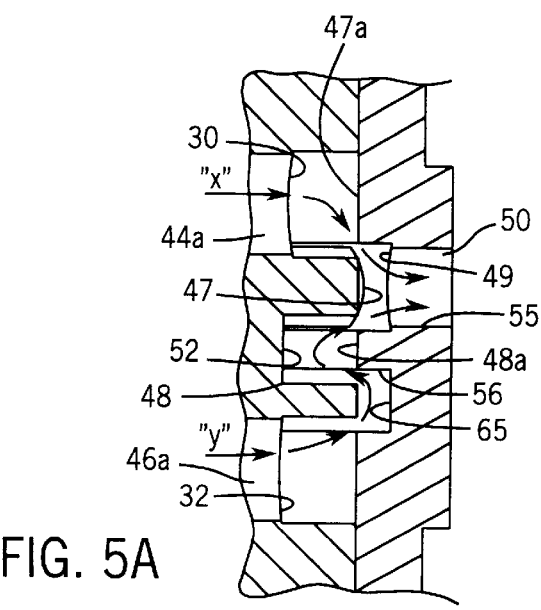
FIG. 5
FIG. 6
FIG. 5A

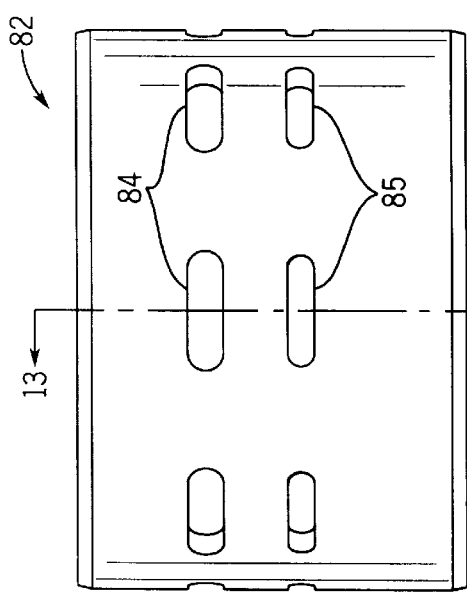
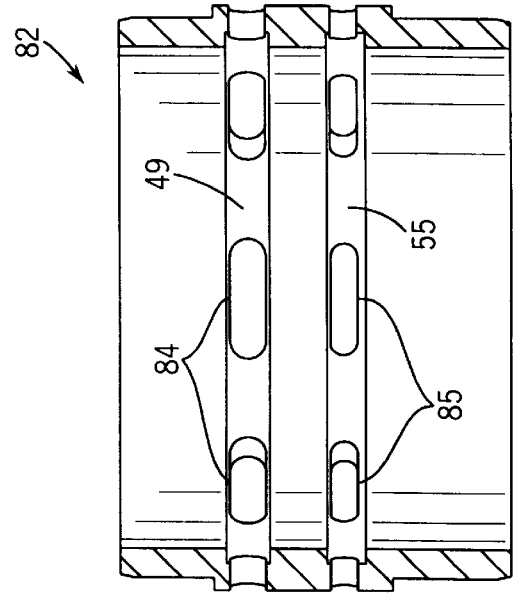
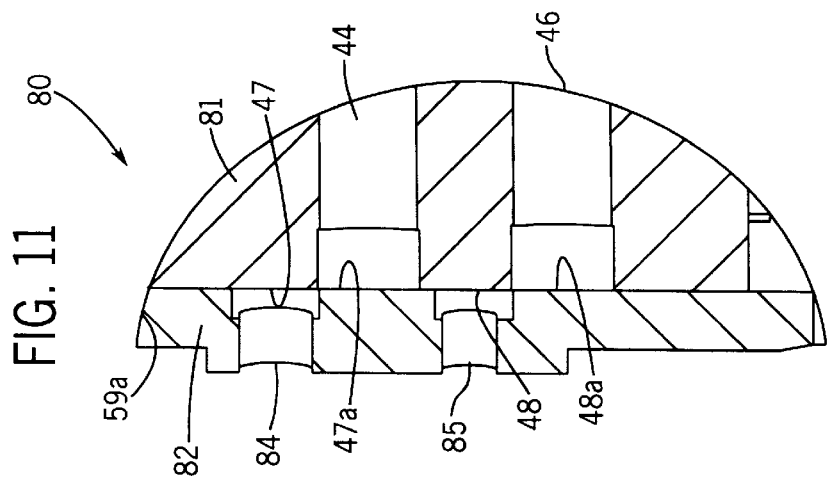
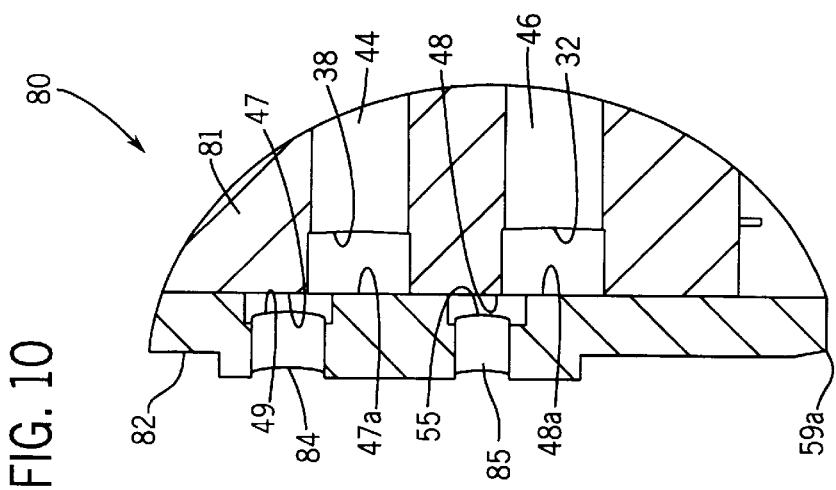

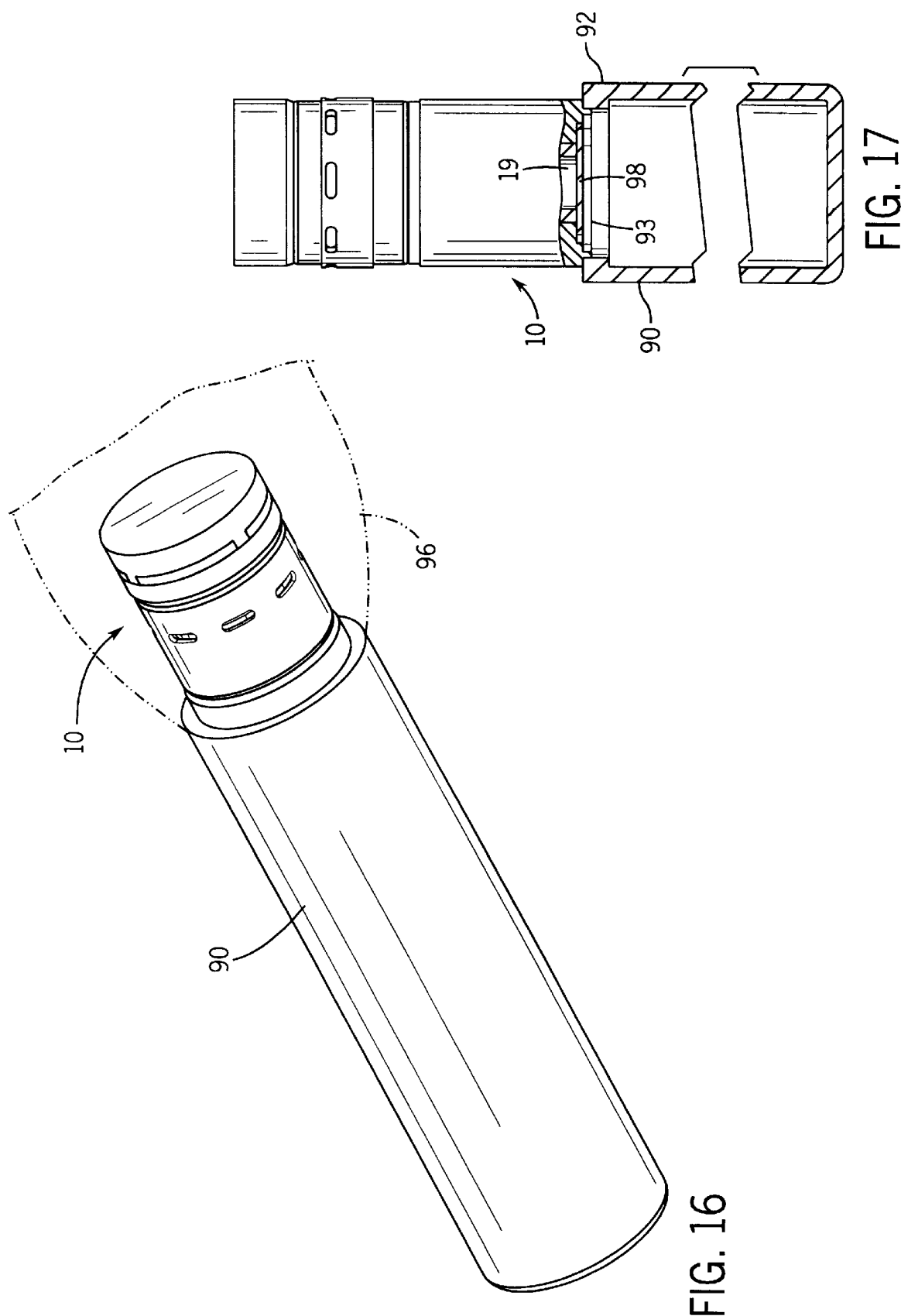

SOLENOID VALVE WITH AN EXTERNAL SLEEVE ARMATURE

BACKGROUND OF THE INVENTION

This invention relates generally to solenoid actuated valves, and more particularly, to solenoid actuated valves including an external sleeve armature.

Spool valves are commonly used for controlling the delivery of fluid, particularly in applications requiring a relatively fast operating time. Spool valves are solenoid operated valves which include a valve spool located within a valve body and movable relative to the valve body between fluid flow permitting and fluid flow preventing positions. The valve spool determines flow paths and as such dictates the size of the valve ports. Because the valve spool is located within the valve body, the outer diameter of the valve spool has to be smaller than the inner diameter of the valve body.

Many fluid flow control applications require rapid shifting movement of the valve spool. One factor in determining the operating time of a direct acting solenoid operated valve is the magnetic force produced by the solenoid. Because the magnetic force is proportional to the cross-sectional areas of coextensive portions of the valve spool and the pole member, when the valve spool is small in size, the magnetic force is also small with the spool acting as an armature. Another factor in determining the operating time of a solenoid operated valve is the mass of the movable valve member, such as a valve spool. The larger the mass of the valve spool, the greater the magnetic force must be to accelerate the valve spool in the desired direction.

One application of spool valves is in the field of inflatable safety restraints for occupants of a vehicle for reducing the possibility of injury to such occupants during a crash. Typical inflatable restraint systems include an inflatable restraint, a source of pressurized gas, and a control mechanism. The control mechanism couples the inflatable restraint to the source of pressurized gas to rapidly inflate the inflatable restraint with the pressurized gas if the vehicle is subjected to a high rate of acceleration or deceleration, as may be caused by a crash, for example.

Many inflatable restraint systems use mechanical or pyrotechnic systems to control inflation of the inflatable restraint. This is partly attributable to the relatively slow response time of known electronically controlled valves. In some valves, mechanical springs are used to bias the valve to its closed position. The force of the spring bias must be overcome to allow the valve to be operated to its open condition. However, the use of spring bias increases the response time for the valve. In addition, the use of a bias spring to move the valve member to one of its positions results in less control, particularly when a shuttling type of operation is desired.

Moreover, the use of a conventional spool valve in inflatable restraint systems can be detrimental because of the small size of the valve spool. In applications such as inflatable restraint systems, particulate matter flows through the valve during operation. The spool bore inlets or outlets can become clogged with the particulate matter during operation of the valve, affecting the distribution pattern for the high pressure fluid being supplied to the inflatable restraint by the valve.

SUMMARY OF THE INVENTION

The present invention provides a solenoid actuated valve for controlling the delivery of a fluid. The solenoid actuated valve comprises a valve body, the valve body having a valve inlet adapted for communication with a source of fluid and at least one valve outlet. At least one solenoid coil is mounted on the valve body; and a sleeve armature is slidably mounted on the exterior of the valve body for controlling fluid flow through the valve outlet. The sleeve armature forms at least a portion of an exterior side wall of the valve. The sleeve armature is disposed in an overlying relationship with the valve outlet and with at least a portion of the solenoid coil. The solenoid coil is energizable to produce magnetic flux for moving the sleeve armature axially relative to the valve body and the valve outlet between first position and second positions. The sleeve armature forms a portion of a magnetic flux path for magnetic flux produced by the solenoid coil. The sleeve armature substantially prevents fluid flow through the valve outlet when the sleeve armature is in a first one of the positions. Fluid flow through the valve outlet is permitted when the sleeve armature is moved away from the first position.

Further in accordance with the invention, there is provided a solenoid actuated valve for controlling the delivery of a fluid which comprises a cylindrical valve body having a valve inlet and a plurality of valve outlets, the valve inlet being adapted for communication with a source of fluid. The valve body has a portion of reduced diameter defining a shoulder near one end of the valve body. At least one solenoid coil is mounted on the valve body, the solenoid coil being located on the shoulder. A generally tubular sleeve armature is slidably disposed on the exterior of the valve body for axial movement between a fluid flow preventing position and a fluid flow permitting position. At least a portion of the sleeve armature overlying the solenoid coil. The valve body and the sleeve armature are configured and arranged to define fluid flow diverters in fluid flow paths through the valve outlets for providing substantially balanced fluid flow through the valve outlets. The solenoid coil is energizable for causing the sleeve armature to move axially relative to the valve body from one of the positions toward the other one of the positions.

Further in accordance with the invention, there is provided a solenoid actuated valve for controlling the delivery of a pressurized fluid, which comprises a valve body having an inlet adapted for communication with a source of fluid and at least one valve outlet. A first solenoid coil is mounted on the valve body and a second solenoid coil is mounted on the valve body spaced apart from the first solenoid coil. A sleeve armature is axially slidably mounted on the exterior of the valve body in overlying relation with the valve outlet for movement relative to the valve outlet between a flow preventing and flow permitting positions. The first solenoid coil is energizable for causing the sleeve armature to be moved from the flow preventing position toward the flow permitting position. The second solenoid coil is energizable for causing the sleeve armature to be moved from the flow permitting position toward the flow preventing position.

In one embodiment, the solenoid actuated fluid flow control valve is described with reference to an application for inflating inflatable restraints for an occupant of a vehicle and the like. However, the solenoid actuated fluid flow control valve can be used in any application, and in particular, in applications which require the control of flow rates to a utilization device or to a space.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 2 is a top view of the solenoid actuated valve of FIG. 1;

FIG. 3 is a side elevation view of the solenoid actuated valve of FIG. 1;

FIG. 5 is an enlarged fragmentary view, in section, of the solenoid actuated valve of FIG. 1, with the solenoid actuated valve shown in its fluid flow permitting condition;

FIG. 5A is an enlarged fragmentary view of a portion of FIG. 5, showing the flow paths through the valve outlets;

FIG. 6 is a view similar to that of FIG. 5 and with the solenoid actuated valve shown in its fluid flow preventing condition;

FIG. 10 is an enlarged fragmentary view, in section, of the solenoid actuated valve of FIG. 7, with the solenoid valve shown in its fluid flow permitting condition;

FIG. 11 is a view similar to that of FIG. 10 and with the solenoid actuated valve shown in its fluid flow preventing condition;

FIG. 12 is an elevation view of the sleeve armature of the solenoid actuated valve of FIG. 7;

FIG. 13 is a vertical section view taken along the line 13—13 of FIG. 12;

FIG. 16 is a perspective view of the solenoid actuated valve of FIG. 1, shown mounted on the outlet of a canister which functions as a source of a high pressure fluid for inflating an inflatable restraint for an occupant of a vehicle;

FIG. 17 is an elevation view, partially in section, showing the solenoid actuated valve mounted on the canister shown in FIG. 16;

FIG. 18, line B is a graph showing current as a function of time for an equivalent spool valve;

FIG. 18, line C is a graph showing the position of the sleeve armature as a function of time;

FIG. 18, line D shows the solenoid coil drive pulses;

FIG. 18, line E shows a solenoid coil drive pulse of negative polarity for countering residual magnetism;

DETAILED DESCRIPTION OF THE PREFERRED EMBODIMENTS

Figure 1:
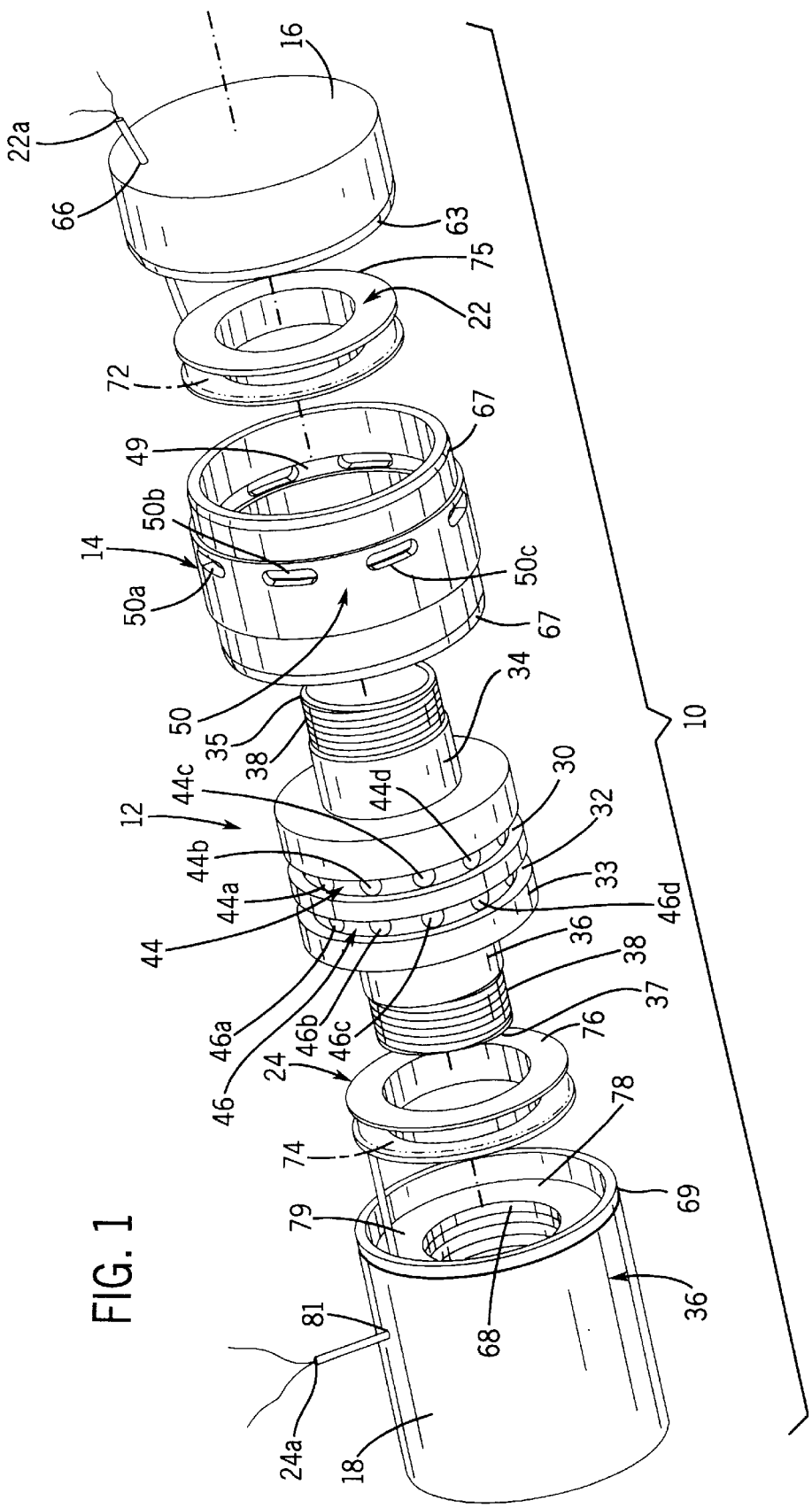
FIG. 1 is an exploded perspective view of the solenoid actuated valve provided by the invention.

Referring to FIGS. 1–4 of the drawings, the solenoid actuated, fluid flow control valve 10 provided by the invention includes a valve body 12, a sleeve armature 14, and a pair of pole members 16 and 18. The valve 10 is a dual solenoid operated valve including valve solenoid coil 22 and valve solenoid coil 24. The valve solenoid coil 22 operates the sleeve armature from a fluid flow preventing condition to a fluid flow permitting condition. The valve solenoid coil 24 operates the sleeve armature from the fluid flow permitting condition to the fluid flow preventing condition. The valve 10 can be used for directing fluid from a source of fluid to a utilization device. The valve is particularly suitable for applications which require regulated fluid flow through the valve because the sleeve armature 14 can be shuttled rapidly between the flow permitting and flow preventing conditions.

The valve 10 is described with reference to an application for controlling the flow of pressurized fluid to an inflatable restraint. However, the valve 10 can be used in other applications, and particularly in applications which require control of flow rates to a utilization device or to a space or volume and wherein at least the outlet portion of the valve is located within the utilization device or enclosed by structure associated with the utilization device or space or volume to which a fluid is being delivered. The valve 10 can be used in such applications where a distinct sealed outlet is not required. The valve 10 is shown oriented vertically in FIGS. 2–6, for example. However, while directions and orientations are used herein for illustrative purposes, it will be apparent that valve 10 of the present invention can operate effectively in any desired direction or orientation.

In one embodiment, the valve body 12 is generally cylindrical in shape and includes an axial bore 26 and a peripheral wall portion 28. The valve body 12 is closed at its upper end. The axial bore 26 terminates, as indicated by reference numeral 29, in a reduced diameter portion near the upper end of the valve body. The bore is in fluid communication with a bore 68 through the pole member 18, defining the valve inlet 19 for the valve 10, at the lower end of the valve body. The valve body 12 includes a necked down portion 34 at one end 35 and a necked down portion 36 at its other end 37. The necked down portions 34 and 36 are formed with threads 38 to facilitate mounting the pole members 16 and 18 on the valve body.

The valve body 12 has plurality of radial bores through the wall portion 28 which defines the vents or outlets for the valve 10. The bores are spaced circumferentially around the valve body and are arranged in first and second sets of valve outlets, indicated generally by reference numerals 44 and 46, respectively. In one embodiment, each set of valve outlets includes twelve bores. Preferably, the valve outlets are spaced apart equally around the circumference of the valve body. The valve body 12 has three annular grooves 30, 32 and 52 in the outer surface 33 thereof. The annular grooves 30, 32 and 52 extend around the circumference of the valve body 12 in a parallel spaced relation. One set of valve outlets 44 includes bores 44a–44d, (FIG. 1) which terminate in one of the annular grooves 30. The other set of valve outlets 46 includes bores 46a–46d (FIG. 1) which terminate in another one of the annular grooves 32. The surfaces of the valve body which define the valve outlets define metering lands, such as metering lands 47 and 48 shown in FIGS. 5 and 5A, adjacent to the valve outlets. In addition, in accordance with one aspect of the invention, the valve body and the sleeve armature define a fluid flow diverter to balance fluid flow through the valve 10, as will be shown.

In one embodiment, the sleeve armature 14 is generally cylindrical in shape. The length and diameter of the sleeve armature can vary as a function of the application of the valve 10. For example, the outer diameter of the sleeve armature is on the order of about two inches to about two and one-quarter inches and in one embodiment is two inches. The length of the sleeve armature is on the order of about one and one-half inches to about two inches and in one embodiment, is one and one-half inches. The inner diameter of the sleeve armature 14 substantially corresponds to the outer diameter of the valve body 12, allowing the sleeve armature 14 to be slidably mounted on the valve body. The sleeve armature is located between the pole members 16 and 18 and defines a portion of an exterior side wall of the valve 10. The sleeve armature 14 is adapted for axial movement between the fluid flow permitting position shown in FIGS. 4–5, and a fluid flow preventing position shown in FIG. 6. Only a short stroke is required so that the air or working gap 59 between the pole member 18 (or 16) and the sleeve armature 14 can be very small. In one embodiment, the working gap 59 between the sleeve armature 14 and the pole piece 18 (or 16) is on the order of about 0.025 inches. Movement of the sleeve armature is 0.025 inches. Parameters, such as the open flow area, stroke length, number of lands, etc, are application specific. The operating speed and the area of the valve outlets are a function of requirements for the specific application. The sleeve armature 14 includes a plurality of openings, indicated generally at 50, through the side wall. In one embodiment, the sleeve armature 14 includes eight openings, such as openings 50a–50c shown in FIG. 1, which are generally oval in shape and having an inner surface 51 (FIG. 5). The inner surface of the sleeve armature includes an interior groove 49, or fly cut, which extends around the circumference of the sleeve armature. The openings 50 terminate in the groove 49. The surfaces 47a and 48a or the sleeve armature 14 define metering lands (FIG. 5A) which cooperate with the metering lands 47 and 48 defined by the valve body 12 to define metering orifices for the valve 10. The sleeve armature is the only moving element of the valve 10 and the movable sleeve armature 14 acts as the metering element of the valve 10 as well as the armature of the valve. The sleeve armature 14 is free to rotate about the valve body 12. The openings 50 are aligned circumferentially and are sized such that the valve outlets 44 and 46 are at least partially communicated with the openings 50 in the sleeve armature regardless of the "rotational" orientation of the sleeve armature with respect to the valve body 12.

Figure 4:
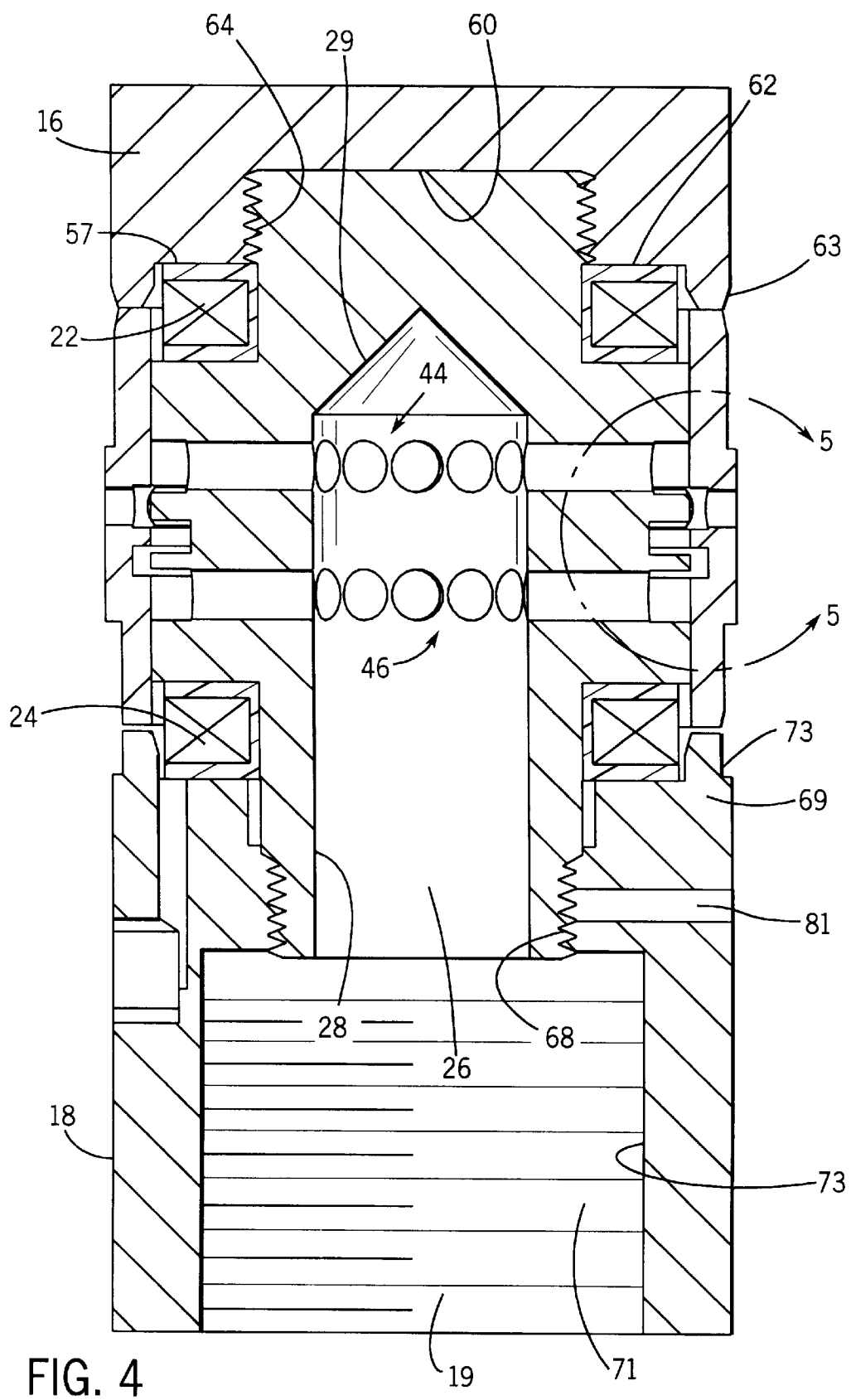
FIG. 4 is a vertical section view taken along the line 4—4 of FIG. 3.
Figure 7:
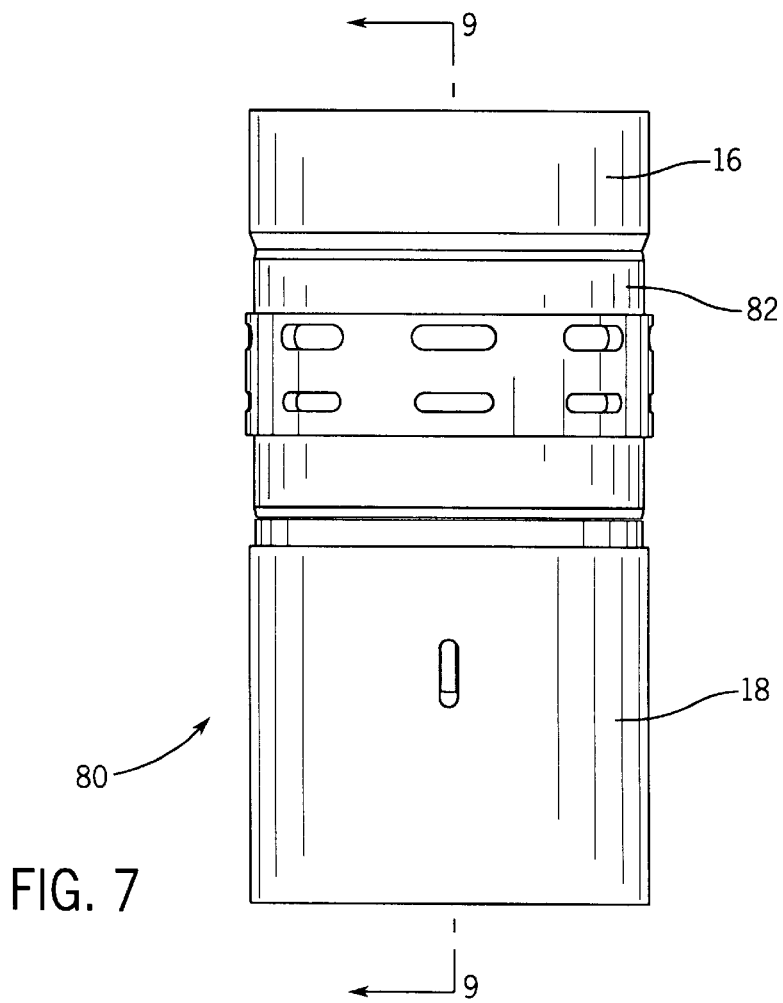
FIG. 7 is a side elevation view of a further embodiment of a solenoid actuated valve provided by the invention.

The valve can be operated as a normally open (NO) valve or a normally closed (NC) valve. FIGS. 4 and 5 illustrate the valve 10 in its normally open or fluid flow permitting condition. For such condition, the sleeve armature 14 is so positioned with respect to the valve body 12 such that the openings 50 in the sleeve armature are communicated with the valve outlets 44 and 46. For this condition, the sleeve armature allows fluid flow through the valve 10, from the valve inlet 19 to the exterior of the valve, through the valve outlets 44 and 46 and the openings 50 in sleeve armature 14. The solid (i.e., non-apertured) portion of the sleeve armature 14 covers or closes the metering orifices, preventing fluid flow through the valve when the sleeve armature is moved away from its fluid flow permitting position shown in FIG. 6, for example.

The sleeve armature 14 can be made of steel or other ferromagnetic material and functions as the armature of the control valve without requiring any further moving parts. Thus, the sleeve armature forms a portion of the magnetic flux path for magnetic flux produced by the valve solenoid coils 22 and 24. One material suitable for the sleeve armature is a high carbon steel. However, other materials can be used for the sleeve armature, the material being is chosen for its residual magnetic properties. The hollow tubular construction of the sleeve armature 14 provides a relatively light weight part such that speed can be maximized for the sleeve armature moving between its fluid flow permitting and preventing positions. Pressure balance is not a concern because the sleeve armature 14 forms an exterior side wall of the valve 10 and is exposed to ambient conditions as a function of its application. Further, because of the relatively large size of the sleeve armature 14, with respect to the size of a valve spool for a comparably sized spool valve, the openings through the sleeve armature 14, as well as the valve outlets 44 and 46, can be relatively large because the sleeve armature provides more surface area over which the openings 50 can be located. In contrast the small diameter of a valve spool limits the spacing between valve outlets. Consequently, the valve outlets 44 and 46 are less susceptible to blockage by particulate matter, such as when the control valve 10 is used in an application for inflating an inflatable restraint, for example. The sleeve armature 14 presents openings that have a relatively large area so that only a small amount of movement of the sleeve armature is required to allow fluid flow through the valve.

Calculating the open flow area for the sleeve valve is done exactly the same as for an equivalent spool type valve. The equation for the area is:

$$A = \pi d x n \quad (1)$$

where d=the diameter of the spool or the inside diameter of the sleeve valve, x=the stroke length, and n=the number of metering lands. The size D of the equivalent orifice for this area is given by the equation:

$$D = 2*(A/\pi)^{0.5}. \quad (2)$$

Thus, for a valve having an outer dimension of 2 inches, and having two metering lands, and a stroke length of 0.025 inches, i.e., where d=2 inches; x=0.025 inches; and n=2, we have the following example:

$$A = \pi(2)(0.025)(2) = 0.31415 \text{ square inches, and} \quad (3)$$

$$D = 2*(31415/\pi)^{0.5} = 0.632 \text{ inches} \quad (4)$$

For a spool type valve of the same dimensions and having a one inch diameter spool, i.e., where d=1 inch; x=0.025 inches; and n=2:

$$A = \pi(1)(0.025)(2) = 0.157 \text{ square inches, and} \quad (5)$$

$$D = 2*(157/\pi)^{0.5} = 0.447 \text{ inches} \quad (6)$$

If, instead, a stroke length "x" of 0.050 is substituted for the stroke length of 0.025 in equation (5):

$$A = \pi(1)(0.05)(2) = 0.31415 \text{ square inches} \quad (7)$$

Based on the above, for this spool type valve with a one inch diameter spool, the stroke length must be twice that for the equivalent sleeve valve, and in the example, a stroke length of 0.050 inches is required to get the same open flow as for the equivalent sleeve valve. For a solenoid valve, the length of the stroke required is directly proportional to the magnetic attraction force available to move the armature and to the speed or response time of the valve. Thus, a spool valve requires a greater force than an equivalent sleeve valve because the transition or movement time of the spool is longer to travel the additional distance.

Reference is now made to FIG. 5, which is an enlarged fragmentary view of a portion of the valve 10. In FIG. 5, the sleeve armature 14 is shown in its open position which allows fluid flow through the valve 10 from the valve inlet 19 and to the exterior of the valve through the valve outlets and the openings in the sleeve armature 14, such as valve outlets 44a and 46a, and opening 50a. In accordance with one aspect of the invention, the valve body 12 and the sleeve armature define a fluid flow diverter in the fluid flow path for causing the velocity of the pressurized fluid to create a pressure gradient on the metering and balancing lands 47, 47a and 48, 48a. To this end, the outer surface of the valve body 12 includes a groove 52 which extends around the circumference of the valve body 12, defining annular diverter portions 53 and 54 in the portion of the valve body located between the two sets of valve outlets 44 and 46, such diverter portions being provided at each valve outlet pair, such as valve outlet pair 44a and 46a, 44b and 46b, etc. In one embodiment, the depth of the groove is slightly greater than the thickness of the side wall portion 28 of the valve body. The sleeve armature 14 includes a further blind, interior annular groove 55 which extends around the circumference of the sleeve armature and parallel to groove 49. The groove 55 defines a surface 56 opposing surface 51 of the aperture 50a, i.e., on the opposite side of the opening 50a. Diverter portion 53 is aligned with the groove 55 for both the flow preventing and flow permitting positions of the sleeve armature.

Referring to FIGS. 1, 4 and 5, the pole member 16 is a generally annular element having a central aperture 60. The pole member 16 is of a suitable magnetic material and can be made high carbon steel chosen for its residual magnetic properties. The pole member 16 is countersunk at its lower end 57, defining a recessed portion 62 surrounded by an axially extending projection 63 of the pole member. The projection 63 tapers downwardly, defining a generally trapezoidal cross section for the projection 63 which assists in directing magnetic flux through the sleeve armature 14 towards the pole member 16 during actuation. The outer edge 67 of the sleeve armature 14 can be beveled slightly so that the opposing surfaces of the sleeve armature and the pole member 16 have approximately the same area. The presence of the tapered surfaces 63 and 67 increases the flux density at the working gap, increasing the pull force.

The inner surface 64 of the pole member 16 is threaded complementary to end of the valve body 12 to facilitate connection of the pole member 16 to the valve body 12. A suitable locking arrangement, such as a tapped hole (not shown), can be provided through the pole member 16 and the valve body 12 for receiving a screw (not shown) to secure the pole member 16 to the valve body 12. The pole member 16 cooperates with the valve body 12 and the sleeve armature 14 to substantially enclose the valve solenoid coil 22 within the cavity formed by the necked down portion of the valve body 12, the recessed portion 62 of the pole member 16, and the inner surface of the sleeve armature 14. The pole member 16 can have one or more openings 66 (FIG. 2) therethrough for leads 22a of the valve solenoid coil 22.

The pole member 18 is generally cylindrical in shape and has a bore 68 therethrough. The pole member 18 is of a suitable magnetic material and can be made high carbon steel chosen for its residual magnetic properties. The pole member 18 is countersunk at the upper end 78, defining a recessed portion 79 surrounded by an axially extending projection 69 (FIG. 4) of the pole member 18. The projection 69 tapers upwardly, defining a generally trapezoidal cross section for the projection which assists in directing magnetic flux through the sleeve armature 14 towards the pole member 18 during actuation. The outer edge 67 of the sleeve armature 14 can be beveled slightly so that the opposing surfaces of the sleeve armature and the pole member 16 have approximately the same area. The presence of the tapered surfaces 69 and 67 increases the flux density at the working gap, increasing the pull force. The inner surface 70 of the bore 68 is threaded complementary to end portion 37 of the valve body 12 to facilitate connection of the pole member 18 to the valve body 12 at the lower end of the valve body. The pole member 18 is countersunk at its lower end to define a larger diameter opening 71, the surface of which is formed with threads 73 to facilitate mounting the valve 10 on a source of pressurized fluid. The pole member 18 cooperates with the valve body 12 and the sleeve armature 14 to substantially enclose the valve solenoid coil 24 within the cavity formed by the necked down portion of the valve body 12, the recessed portion 79 of pole member 18, and the inner surface of the sleeve armature 14. The pole member 18 can have one or more openings 81 (FIG. 4) through the side wall for the leads 24a of the valve solenoid coil 24.

Referring to FIGS. 1, 4 and 5, the valve solenoid coils 22 and 24 include solenoid windings 72 and 74 respectively, which are wound on bobbins 75 and 76. The valve solenoid coil 22 is located on the necked down portion 34 of the valve body 12 and the valve solenoid coil 24 is located on the necked down portion 36 of the valve body. The sleeve armature has an inner diameter that is greater than an outer diameter of the valve solenoid coils 22 and 24 so that the sleeve armature can overlie the valve solenoid coils. In one embodiment, the solenoid coils 72 and 74 have a resistance in the range of about one-quarter to one-half ohm, for example. The solenoid coils are energized by current pulses of a relatively short duration to reduce the current in the coils 72 and 74. In one embodiment, the drive pulses for the solenoid coils 22 and 24 have a pulse width of about 6 milliseconds and a pulse rate of 12 milliseconds, as shown by curve D of FIG. 18. The current in the solenoid coil decays to zero about 1 millisecond. Because of the size of the solenoid coils 72 and 74, the length of the wire to provide the equivalent turns is greater than that for equivalent spool valve, resulting in a larger inductance. Accordingly, the current rises slower as can be seen by comparing the curves A and B in FIG. 18 which represent, respectively, current as a function of time for the sleeve valve 10 and an equivalent spool valve. Moreover, the larger area afforded by the sleeve armature with respect to the pole members, results in a larger force for less applied current.

Figure 18:
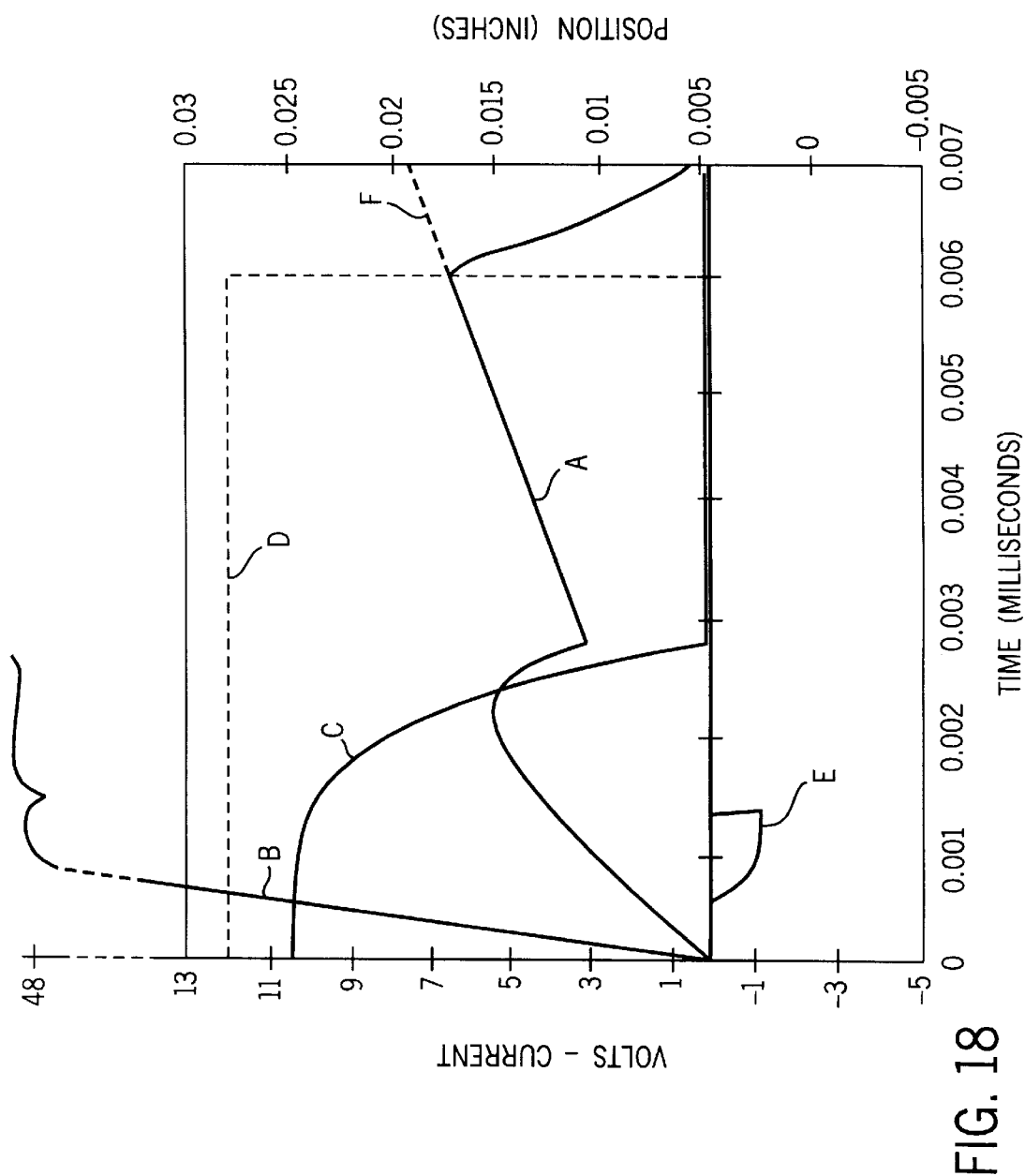
FIG. 18, line A is a graph showing current as a function of time for the solenoid actuated valve of FIG. 1.

The valve solenoid coils 22 and 24 are individually operable by a suitable controller (not shown) which allows the sleeve armature 14 to be moved or shuttled between its open and closed positions, in use. When the valve solenoid coil 24 is energized, the sleeve armature 14 is moved from its open, or fluid flow permitting position, to its closed or fluid flow preventing position. When the valve solenoid coil 22 is energized, the sleeve armature 14 is moved from its closed, or fluid flow preventing position to its open, or fluid flow permitting position. Once operated to one of its positions, the sleeve armature 14 is maintained in that position due to the effects of residual magnetism. In addition, when the valve solenoid coil 24 is energized for driving the sleeve armature 14 to its closed position, or when the valve solenoid coil 22 is energized for driving the sleeve armature 14 to its open position, the other valve solenoid coil can be activated with a short duration pulse of negative polarity to assist in overcoming the effects of residual magnetism. Preferably, the negative going drive pulse, curve E in FIG. 18, is applied to the solenoid coil a short time after the other solenoid coil is energized. In one embodiment, the negative current pulse is delayed about 0.5 to 1.2 milliseconds.

Figure 8:
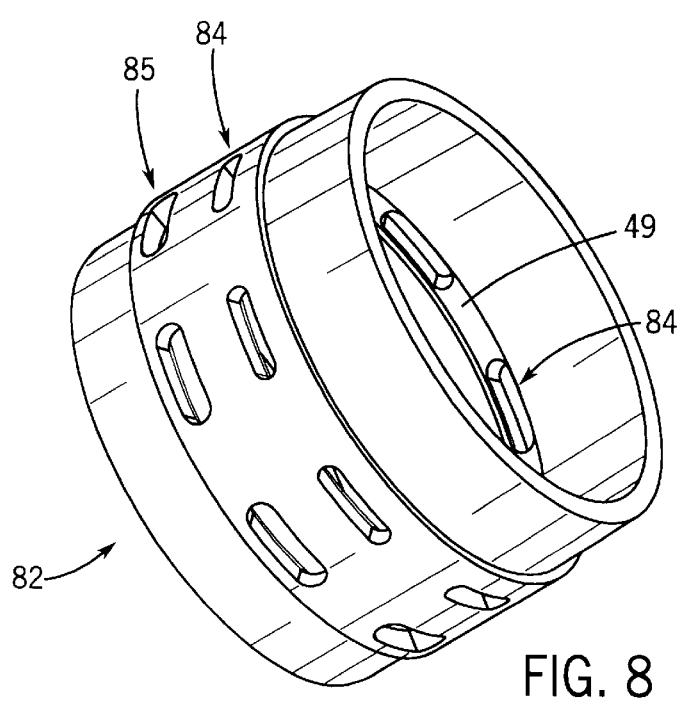
FIG. 8 is an enlarged, perspective view of a sleeve armature of the solenoid actuated valve of FIG. 7.
Figure 9:
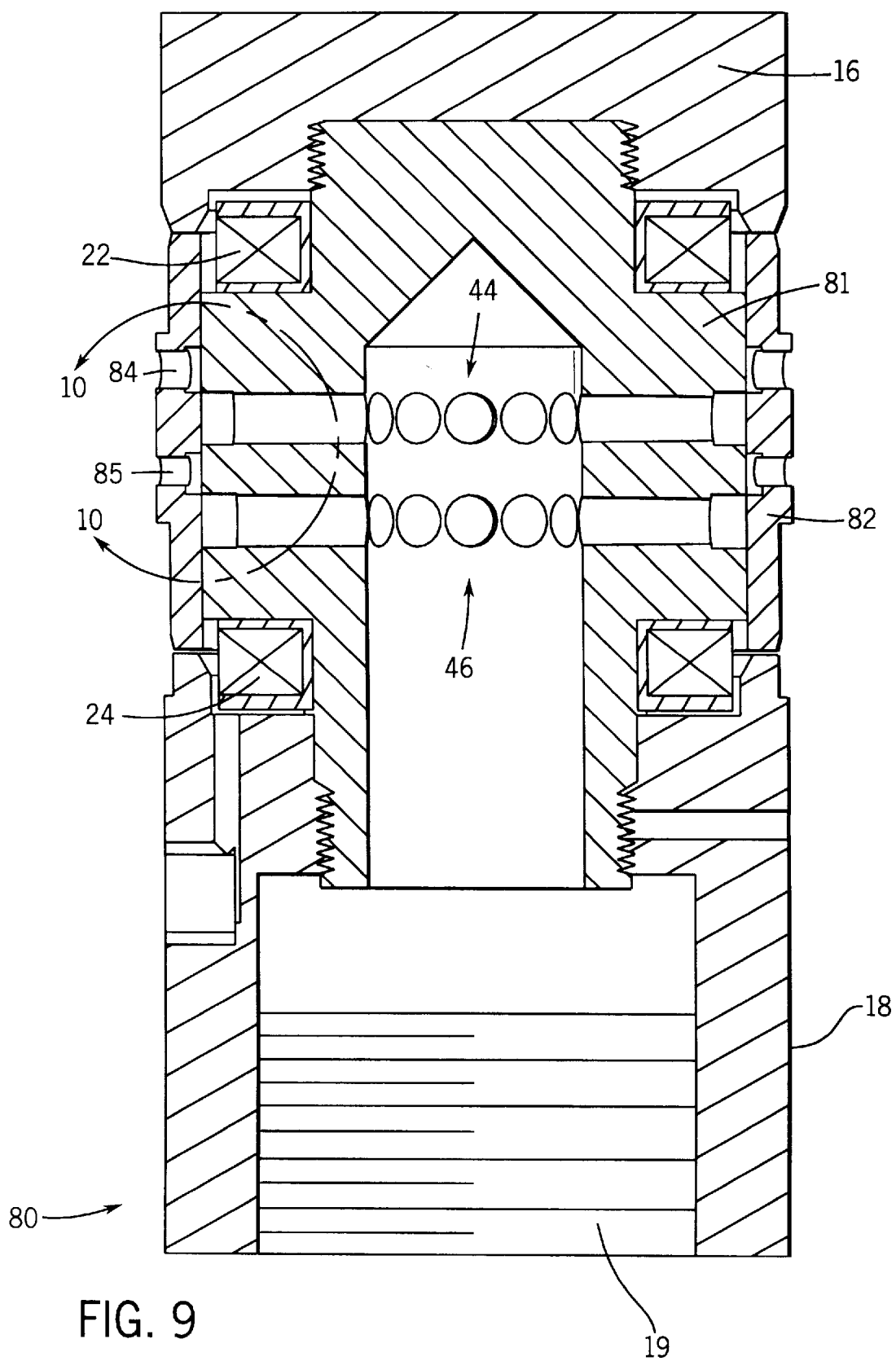
FIG. 9 is a vertical section view taken along the line 9—9 of FIG. 7.

Referring to FIGS. 7–13, there is shown a second embodiment of a dual solenoid, sleeve armature valve 80, provided by the invention. The control valve 80 is generally similar to the valve 10 which has been described above with reference to FIGS. 1–6. Accordingly, like or corresponding elements have been given the same reference numerals. The valve 80 is particularly suitable for applications in which the magnetic force produced by the valve solenoid coils is substantially greater than forces due to fluid flow pressure. The sleeve armature 82, which is shown in FIGS. 8 and 12–13, for example, of the valve 80 is different from the sleeve armature 14 of valve 10 in that it includes two rows of openings 84 and 85. Also, in the valve 80, the valve body 81 does not include a groove, corresponding to the groove 52 of valve body 12, between the rows of valve outlets 44 and 46. However, the valve 80, like valve 10, is a two solenoid valve, including solenoid coil 22 for moving the sleeve armature 82 to the flow preventing position, and solenoid coil 24 for moving the sleeve armature 82 to the flow permitting position, the sleeve armature being held in a position to which it is driven by residual magnetism. The solenoid coil drive pulses can be the same as used for driving the solenoid coils 22 and 24 of the valve 10. Also, the sleeve armature 82 defines at least a portion of an exterior side wall of the valve 80 and forms a portion of the magnetic flux path for magnetic flux produced by the valve solenoid coils 22 and 24.

The sets of openings 84 and 85 through its side wall sleeve armature 82 are disposed in two rows which extend around the circumference of the sleeve armature in spaced relation. The openings 84 and 85 at least partially overlie the two sets or rows of vent openings 44 and 46, respectively, in the valve body 12 when the sleeve armature is in the fluid flow permitting position as shown in FIG. 10. Consequently, this allows fluid supplied to the valve inlet 19 to flow out of the valve 80 through valve outlets 44 and the openings 84 in the sleeve armature 82, and through valve outlets 46 and openings 85 in the sleeve armature. The valve 80 does not provide flow balance in the manner of the valve 10. Fluid flow through the valve 80 is substantially prevented when the sleeve armature is in the closed or fluid flow preventing position illustrated in FIG. 11.

The valve 80 is shown oriented vertically in FIGS. 7 and 9–11, for example. However, while directions and orientations are used herein for illustrative purposes, it will be apparent that the valve 80 of the present invention can operate effectively in any desired direction or orientation.

Figure 15:
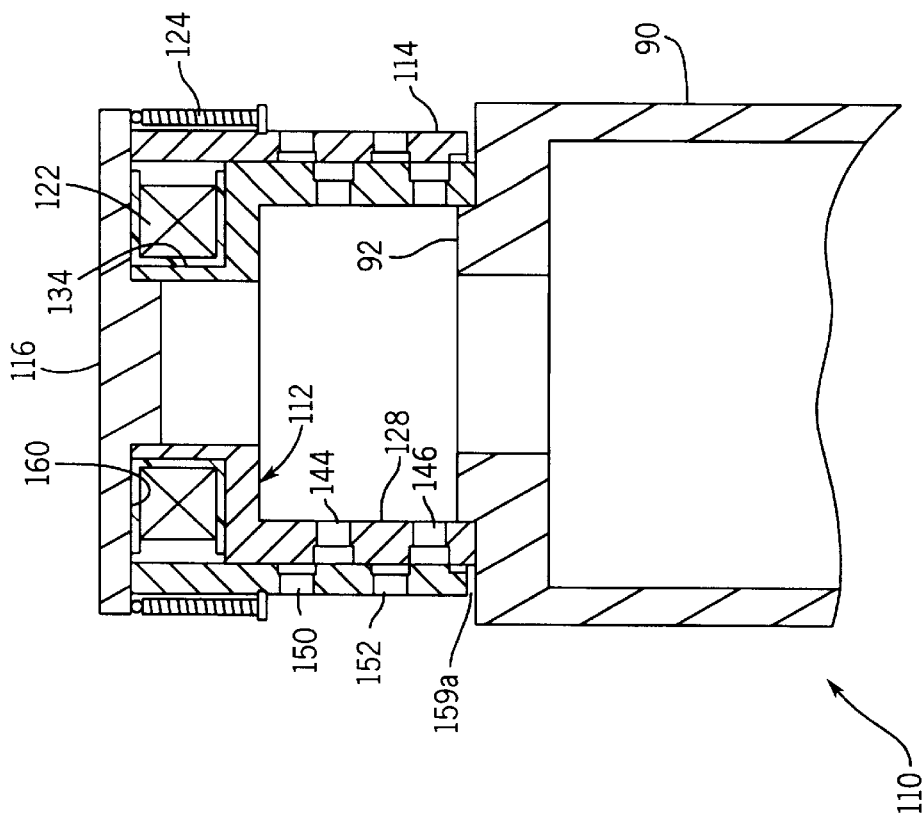
FIG. 15 is a view similar to that of FIG. 14 and with the solenoid actuated valve shown in its fluid flow preventing condition.
Figure 14:
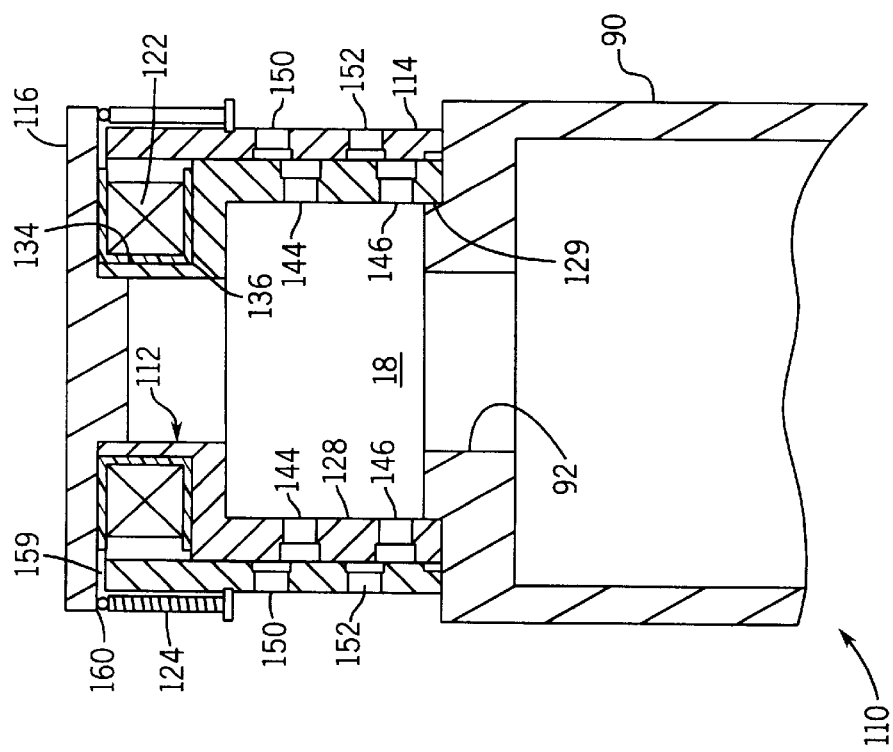
FIG. 14 is an enlarged section view of a solenoid actuated valve in accordance with a further embodiment of the invention, with the solenoid actuated valve shown in its fluid flow permitting condition and being mounted on the outlet of a source of a high pressure fluid.

Referring to FIGS. 14 and 15, in accordance with another embodiment, a solenoid actuated, fluid flow control valve 110 includes a valve body 112, a sleeve armature 114, a pole member 116, a solenoid coil 122 and a mechanical bias structure 124, such as a coil spring or any other resilient type member. The valve body 112 preferably is hollow, generally cylindrical in shape and includes an outer peripheral wall portion 128 and a central opening 129 at one end. The valve body 112 is a thin walled, tubular member, in contrast to the solid body configuration for the valve body 12 of the solenoid actuated valve 10 shown in FIGS. 1–3. The valve body 112 includes a necked down portion 134 which defines an annular shoulder 136 for locating the solenoid coil 122. The valve body 112 includes two sets 144 and 146 of openings through the side wall 128 of the valve body 112, defining vents or valve outlets for the valve 110, generally in the manner of valve 80 described above with reference to FIGS. 7–13. The valve 110 is shown mounted on the neck 92 of a canister 90 or other container.

The sleeve armature 114 is cylindrical in shape and can be generally similar to sleeve armature 82. The inner diameter of the sleeve armature 114 substantially corresponds to the outer diameter of the valve body 112. The sleeve armature 114 includes two sets of openings 150 and 152 through a side wall thereof, the openings being arranged in two rows which extend along the circumference of the sleeve armature. The sleeve armature 114 forms a major portion of the exterior side wall of the valve 110.

The pole member 116 is mounted on the valve body 112 to partially enclose the surfaces of the solenoid coil 122. The pole member 116 is a generally disc shaped element and is stepped down around its periphery, defining a shoulder 160 for accommodating the solenoid coil 122. The pole member 116 is mounted on the end of the valve body 112 overlying the solenoid coil 122 and the upper end of the sleeve armature 114. The sleeve armature 114 is spaced apart from the pole member 116, defining a gap 159 (FIG. 14) when the sleeve armature is in the fluid flow permitting position. The sleeve armature engages the pole member 116 and is spaced apart from the canister 90 defining a gap 159a when the sleeve armature 114 is in the fluid flow preventing position.

The bias spring 124 is interposed between the upper end of the sleeve armature 114 and the bottom surface of the pole member 116. In one embodiment, the bias spring 124 biases the sleeve armature 114 toward its open, or fluid flow permitting position. The bias spring 124 is sized to overcome the force of residual magnetism. Alternatively, the valve solenoid coil 122 can be activated with a short duration pulse of negative polarity to assist in overcoming residual magnetism in moving the sleeve armature 114 toward its closed position. Moreover, the bias spring can be located to bias the sleeve armature to the closed, or fluid flow preventing condition, in which case, the solenoid coil moves the sleeve armature from the closed position to the open position.

The valve solenoid coil 122 moves the sleeve armature 114 from its open, or fluid flow permitting position (FIG. 14), to its closed, or fluid flow preventing position (FIG. 15), against the force of the bias spring 124. When the valve solenoid coil 122 is energized, the sleeve armature 114 is moved axially relative to the valve body 112 from the open position to the closed position. In one embodiment, residual magnetism maintains the sleeve armature 114 in a position to which it has been driven.

The valve 110 is shown oriented vertically in FIGS. 14 and 15, for example. However, while directions and orientations are used herein for illustrative purposes, it will be apparent that the valve 110 of the present invention can operate effectively in any desired direction or orientation.

Operation

The following description of the operation of the solenoid actuated control valves provided by the present invention makes specific reference to the valve 10 shown in FIGS. 1–6. Referring to FIGS. 1–6 and 17, the valve 10 is described with reference to an application for controlling the flow of fluid to an inflatable restraint for an occupant of a vehicle. However, it is apparent that the valve 10 can be used in other applications. Also, it is assumed that the valve 10 is in its fluid flow preventing condition, as shown in FIG. 6, for example.

In FIGS. 16–17, the valve 10 is shown mounted on the neck 92 of a canister 90 or other container. The valve 10 has its inlet 19 coupled to an outlet 93 (FIG. 17) of the canister 90 and its valve outlets disposed in fluid communication with an inlet of a vehicular occupant-resistant inflatable restraint, a portion of which is represented by the dashed line 96 shown in FIG. 16. It is understood that the inflatable restraint 96 may be used to restrain occupants and/or other objects within a vehicle. Inflatable restraints include inflatable air bags, inflatable bolsters, inflatable curtains, and other types of inflatable restraining devices. The canister 90 functions as a source of a high pressure fluid for inflating the inflatable restraint. The valve 10 controls the rate of inflation of the inflatable restraint. The canister 90 is preferably compact to facilitate efficient mounting within a vehicle. As used herein, vehicle is defined as a means of carrying, or transporting something such as passengers and/or items. For example, vehicle can be a land-based vehicle, such as automobiles, trucks, buses, motorcycles railway engines and cars, a water-based vehicle such as boats or ships or submarines, or a flying vehicle such as aircraft or space vehicles.

In one embodiment, inflation of the inflatable restraint is caused by a pyrotechnic expansion of gases contained in a high pressure canister for supplying a fluid under high pressure to the inflatable restraint. The canister temporarily contains the fluid under high pressure following the pyrotechnic event. Alternatively, the canister may store a pressurized fluid which is supplied to the inflatable restraint. This advantageously provides smokeless inflation and avoids the undesirable effects of the relatively large pyrotechnic explosion, such as the generation of particulates and loud explosion noises. The canister typically includes a conventional rupture diaphragm or disc seal 98 (FIG. 17). The high pressure fluid is continuously contained in the canister until the disc seal 98 is intentionally ruptured, in a known manner, allowing the pressurized fluid to flow into the control valve to be introduced into the inflatable restraint for inflating the inflatable restraint. In a further alternative, the inflation of the inflatable restraint can be provided using a combination or hybrid arrangement of the two inflation techniques.

Referring to FIGS. 4–6, in the operating position shown in FIG. 6, the valve inlet 19 is communicated with the valve outlets 44 and 46. However, the sleeve armature 14 is positioned with a portion of its solid wall overlying the valve outlets. Consequently, fluid flow through the valve outlets 44 and 46 is prevented by the inner surface of the sleeve armature 14 which overlaps the outer surface of the valve body 12. Thus, initially following the pyrotechnic event or upon rupture of the disc seal, the high pressure fluid supplied to the inlet 19 of the valve 10 is substantially prevented from flowing through the valve 10 until the valve solenoid coil 22 is energized.

Referring to FIG. 18, curve A is a graph illustrating solenoid coil current "I", in amperes, as a function of time "T", in milliseconds, for the valves 10 and curve C is a graph illustrating the position, in inches, of the valve spool as a function of time "T" for the valve 10. Curve D represents the voltage applied to the solenoid coil. The solenoid coil 22 is energized by a step input, such as a twelve volt pulse, six milliseconds in duration. The elapsed time is about 1.3 to 1.6 milliseconds. The inductance of the winding changes as the sleeve armature 14 is moved away from the pole member 18 toward pole member 16. The current "I" increases to about 5 amperes after about 2 milliseconds. Initially, there is minimal movement of the sleeve armature. When the sleeve armature begins to move, after about 1.5 milliseconds, a negative or reverse current pulse of a fixed amplitude and duration, curve E in FIG. 18, is applied to the other solenoid coil 24, to assist in overcoming the affects of residual magnetism. When the sleeve armature begins to move, the current begins to decrease slightly, reaching a decreased level creating a cusp in the curve. When the sleeve armature reaches the end of travel after about 2.7 milliseconds, and stops, the current begins to increase because the solenoid force continues to rise. However, the voltage pulse terminates at 6 milliseconds at which time, the current begins to decrease. The current decreases to about zero in about 0.5 milliseconds to one millisecond.

When the valve solenoid coil 22 is energized, the magnetic flux across the working gap 59 between the end surface of the pole member 16 and the end surface of the sleeve armature 14 causes the sleeve armature 14 to be moved away from its closed position towards the open position, illustrated in FIG. 5, at which the end surface of the sleeve armature 14 engages the surface of the pole member 16. Referring to FIGS. 5 and 5A, when the sleeve armature 14 is in its open position, allowing fluid flow through the valve, the velocity of the fluid causes a pressure gradient on the metering lands 47 and 48. This pressure gradually causes a net force (F2–F1, where F2 is the pressure force on surface 51 and F1 is the pressure force on surface 56) on the sleeve armature 14 which tends to move the sleeve armature 14 toward its closed position. This condition is based on mass flow which in a gas system is substantially less than typical hydraulic control valves.

However, this effect is minimized by the flow diverter arrangement of the valve 10. More specifically, the when the sleeve armature 14 is in the fluid flow permitting position (FIG. 5A), fluid flow is provided in the direction of the arrows along a first flow path "X" through valve outlet 44a and the opening 50 in the sleeve armature 14. In addition, fluid flow is provided in the direction of the arrows along a second flow path "Y" through valve outlet 46a and the opening 50 in the sleeve armature 14, where the two flow paths "X" and "Y" merge. The fluid flow along the path "X" creates pressure forces against balancing surface 55 in opening 50 in the sleeve armature, tending to drive the sleeve armature 14 toward the closed position. However, fluid flow along the path "Y" creates pressure forces against balancing surface 56 on the backside of the opening 50 in the sleeve armature, substantially offsetting the pressure forces being applied to the sleeve armature 14 due to fluid flow along path "X". Thus, because of the fluid flow diverter arrangement, the pressure forces of path "Y" substantially cancel the pressure forces of path X, resulting in substantially balanced flow forces. It is pointed out that the flow forces are not completely balanced because the flow force along path "Y" is attenuated somewhat because the fluid under pressure flowing along path "Y" is directed into groove 55 and then into groove 52 before merging with the fluid flowing along path "X". Thus, there can be a small net flow force, tending to drive the sleeve armature toward the closed position.

Figure 19:
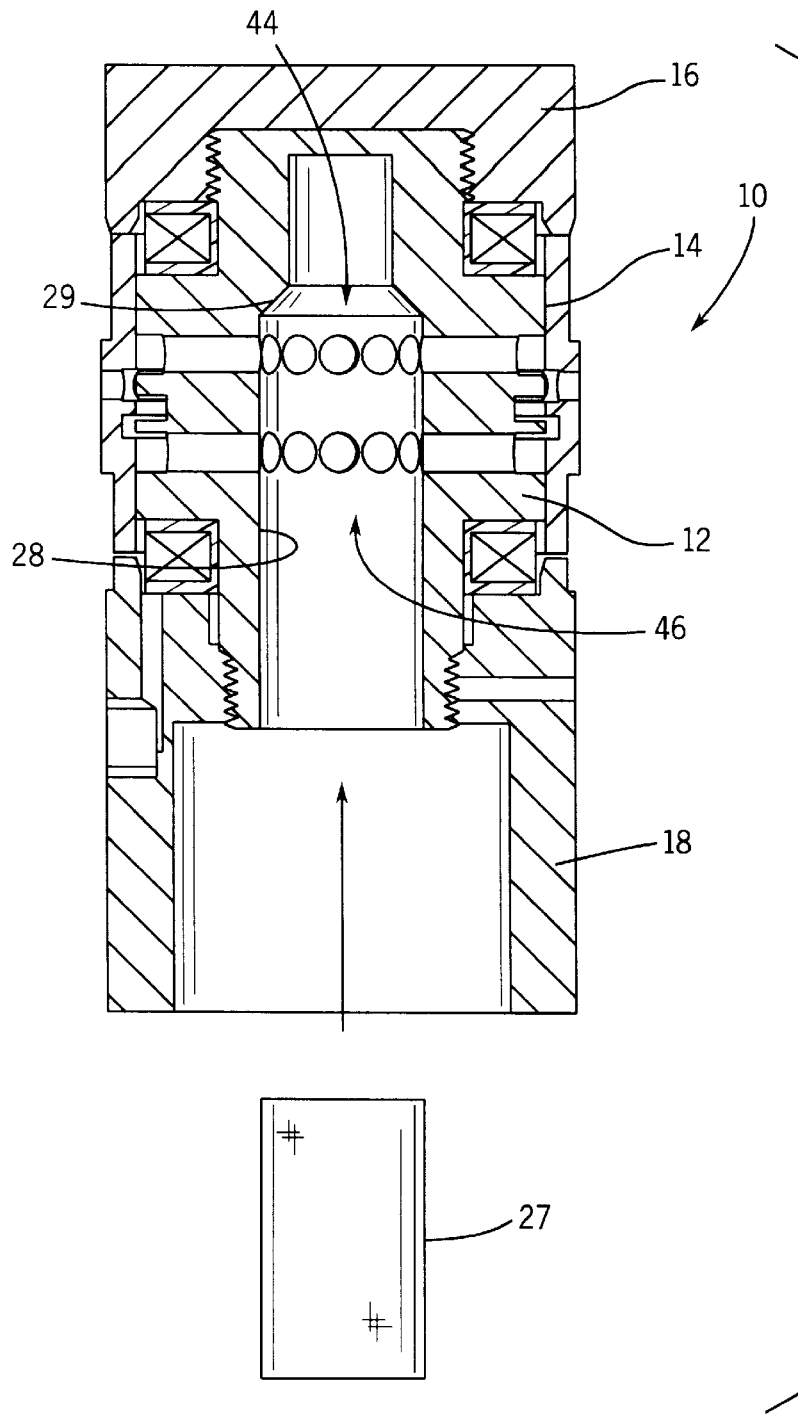
FIG. 19 is a view similar to FIG. 4 and showing a filter for the solenoid actuated valve for preventing particulate matter from reaching the valve outlets when the valve is used in an application for inflating an inflatable restraint.
Figure 20:
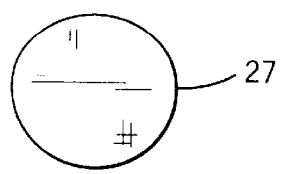
FIG. 20 is a top view of the filter of FIG. 19.

Referring to FIG. 19, which is a view similar to FIG. 4, when the valve 10 is used in an application for inflating an inflatable restraint, or other applications where it is possible that particulate matter may flow through the valve, the valve 10 can include a filter 27. The filter can be a mesh screen or any other suitable material that prevents the flow of particulate matter while allowing substantially unobstructed flow of the pressurized fluid to the valve outlets. In one embodiment, the filter is a generally cylindrical element which is dimensioned to be located in the interior of the valve body 12, overlying the valve outlets 44 and 46 for preventing particulate matter from reaching the valve outlets. Referring also to FIG. 20, the filter 27 is generally cylindrical and is sized to fit in the space surrounding the valve outlets 44 and 46, engaging the wall 28. The upper end of the filter can be seated in the tapered surface 29 of the valve body. Alternatively, the filter can comprise a screen element extending across the valve inlet, or a relatively porous screen element located in the proximity of the tapered portion 29. In the latter embodiment, the screen element permits particulate matter to pass through the screen, but traps the particulate matter in the cavity defined by the pole member 16, above the valve outlets, preventing most of the particulate matter from reaching the valve outlets.

The valves 80 and 110 operate in a manner generally similar to that of the valve 10, except that the valves 80 and 110 do not provide flow balancing and valve 110 is a single valve, Accordingly, the manner in which the valves 80 and 110 operate will be apparent from the foregoing description of the operation of valve 10, with the sleeve armature of valve 110 being moved to one of its positions by a mechanical bias, rather than by a solenoid.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What we claim is:

1. A solenoid actuated valve for controlling the delivery of a fluid, the solenoid actuated valve comprising:
    a valve body, the valve body having a valve inlet adapted for communication with a source of fluid and at least one valve outlet;
    at least one solenoid coil mounted on the valve body; and
    a sleeve armature slidably mounted on the exterior of the valve body for controlling fluid flow through the valve outlet, the sleeve armature forming at least a portion of an exterior side wall of the valve and being disposed in an overlying relationship with the valve outlet and with at least a portion of the solenoid coil;
    the solenoid coil being energizable to produce magnetic flux for moving the sleeve armature axially relative to the valve body and the valve outlet between first position and second positions, the sleeve armature forming a portion of a magnetic flux path for magnetic flux produced by the solenoid coil, and the sleeve armature substantially preventing fluid flow through the valve outlet when the sleeve armature is in a first one of said positions, and fluid flow through the valve outlet being permitted when the sleeve armature is moved away from said first position.

2. The valve according to claim 1, and including at least one pole member interposed between the valve body and the sleeve armature, the pole member being disposed to be axially spaced from an end of the sleeve armature, defining a working gap between the pole member and the sleeve armature when the sleeve armature is at one of said first and second positions.

3. The valve according to claim 1, wherein the valve body at least partially defines a cavity having an opening, the solenoid coil being located within the cavity, the sleeve armature overlying at least a portion of the opening of the cavity.

4. The valve according to claim 3, wherein the cavity is located near one end of the valve body.

5. The valve according to claim 1, wherein the valve body and the sleeve armature are configured and arranged to define a fluid flow diverter in fluid flow paths through the valve outlets for providing substantially balanced fluid flow through the valve outlets.

6. The valve according to claim 1, and including a further solenoid coil for moving the sleeve armature axially toward the other one of said first and second positions.

7. The valve according to claim 1, and including a bias structure for moving the sleeve armature axially toward the other one of said first and second positions.

8. The valve according to claim 1, wherein the valve body includes a plurality of valve outlets in the valve body, the valve outlets being spaced around the circumference of the valve body.

9. The valve according to claim 8, and including a groove or channel formed in the outer surface of the valve body and in fluid communication with the valve outlets.

10. The valve according to claim 8, wherein the valve outlets are arranged in first and second rows.

11. The valve according to claim 1, wherein the sleeve armature comprises a ferromagnetic material.

12. The valve according to claim 1, wherein the sleeve armature has an inner diameter that is greater than an outer diameter of the solenoid coil.

13. A solenoid actuated valve for controlling the delivery of a fluid, the solenoid actuated valve comprising:
    a cylindrical valve body having a valve inlet and a plurality of valve outlets, the valve inlet being adapted for communication with a source of fluid, the valve body having a portion of reduced diameter defining a shoulder near one end of the valve body;
    at least one solenoid coil mounted on the valve body, the solenoid coil being located on the shoulder;
    a generally tubular sleeve armature, the sleeve armature being slidably disposed on the exterior of the valve body for axial movement between a fluid flow preventing position and a fluid flow permitting position, at least a portion of the sleeve armature overlying the solenoid coil;
    the valve body and the sleeve armature are configured and arranged to define a fluid flow diverter in at least one of the fluid flow paths through the valve outlets for directing the pressurized fluid to at least first and second opposing pressure balancing surfaces to produce balancing pressure forces, thereby providing substantially balanced fluid flow through the valve outlets;
    the solenoid coil being energizable for causing the sleeve armature to move axially axially relative to the valve body from one of the positions toward the other one of the positions.

14. The valve according to claim 13, wherein the sleeve armature comprises a magnetic material, and wherein the sleeve armature forms a portion of a magnetic flux path for magnetic flux produced by the solenoid coil.

15. The valve according to claim 13, and including a second solenoid coil for moving the sleeve armature axially toward the other one of said flow preventing and flow permitting positions.

16. The valve according to claim 15, wherein the pressure balancing surfaces are defined by the sleeve armature.

17. The valve according to claim 13, and including a bias structure for moving the sleeve armature axially toward said other one of said flow preventing and flow permitting positions.

18. A solenoid actuated valve for controlling the delivery of a pressurized fluid, the solenoid actuated valve comprising:

a valve body, the valve body having an inlet adapted for communication with a source of fluid and at least one valve outlet;

a first solenoid coil mounted on the valve body;

a second solenoid coil mounted on the valve body spaced apart from the first solenoid coil; and a sleeve armature axially slidably mounted on the exterior of the valve body in overlying relation with the valve outlet for movement relative to the valve outlet between a flow preventing and flow permitting positions, the first solenoid coil being energizable for causing the sleeve armature to be moved from the flow preventing position toward the flow permitting position, and the second solenoid coil being energizable for causing the sleeve armature to be moved from the flow permitting position toward the flow preventing position.

19. The valve according to claim 18, wherein the sleeve armature overlies at least a portion of the first solenoid coil and overlies at least a portion of the second solenoid coil.

20. The valve according to claim 18, and including at least one pole member disposed to be axially spaced from an end of the sleeve armature, the pole member being spaced from the sleeve armature defining a working gap when the sleeve armature is in one of said flow preventing and flow permitting positions.

21. The valve according to claim 18, wherein the valve body and the sleeve armature are configured and arranged to define a fluid flow diverter in fluid flow paths through the valve outlets for providing substantially balanced fluid flow through the valve outlets.

22. The valve according to claim 18, wherein the valve body includes an interior cavity generally cylindrical in shape and extending axially of the valve body, the interior cavity being communicated with the valve inlet, and a plurality of passageways through a side wall of the valve body defining a plurality of valve outlets for the valve, the valve outlets being communicated with the valve inlet through the interior cavity.

23. A solenoid actuated valve for controlling the delivery of a pressurized fluid to an inflatable restraint, the solenoid actuated valve comprising:

a valve body, the valve body having a valve inlet adapted for communication with a source of fluid and at least one valve outlet;

at least one solenoid coil mounted on the valve body; and a sleeve armature slidably mounted on the exterior of the valve body for controlling fluid flow through the valve outlet, the sleeve armature forming at least a portion of an exterior side wall of the valve and being disposed in an overlying relationship with the valve outlet and with at least a portion of the solenoid coil;

the solenoid coil being energizable to produce magnetic flux for moving the sleeve armature axially relative to the valve body and the valve outlet between first position and second positions, the sleeve armature forming a portion of a magnetic flux path for magnetic flux produced by the solenoid coil, and the sleeve armature substantially preventing fluid flow through the valve outlet when the sleeve armature is in a first one of said positions, and fluid flow through the valve outlet being permitted when the sleeve armature is moved away from said first position.

24. The valve according to claim 23, and including at least one pole member interposed between the valve body and the sleeve armature, the pole member being disposed to be axially spaced from an end of the sleeve armature, defining a working gap between the pole member and the sleeve armature when the sleeve armature is at one of said first and second positions.

25. The valve according to claim 23, wherein the valve body at least partially defines a cavity having an opening, the solenoid coil being located within the cavity, the sleeve armature overlying at least a portion of the opening of the cavity.

26. The valve according to claim 23, wherein the valve body and the sleeve armature are configured and arranged to define fluid flow diverters in fluid flow paths through the valve outlets for providing substantially balanced fluid flow through the valve outlets.

27. The valve according to claim 23, and including a further solenoid coil for moving the sleeve armature axially toward the other one of said first and second positions.

28. The valve according to claim 23, and including a bias structure for moving the sleeve armature axially toward the other one of said first and second positions.

29. The valve according to claim 23, wherein the valve body includes a plurality of valve outlets in the valve body, the valve outlets being spaced around the circumference of the valve body.

30. The valve according to claim 29, and including a groove or channel formed in the outer surface of the valve body and in fluid communication with the valve outlets.

31. The valve according to claim 29, wherein the valve outlets are arranged in first and second rows.

32. The valve according to claim 23, wherein the sleeve armature has an inner diameter that is greater than an outer diameter of the solenoid coil.

* * * * *